United States Patent [19]
Kendall

[11] 3,726,587
[45] Apr. 10, 1973

[54] BIFOCAL CORNEAL CONTACT LENS AND METHOD OF MAKING SAME

[76] Inventor: Claud A. Kendall, 95 Fairmont Avenue, Fairmont, W. Va.

[22] Filed: Mar. 9, 1971

[21] Appl. No.: 122,419

Related U.S. Application Data

[63] Continuation-in-part of Ser. No. 844,801, July 25, 1969, abandoned, which is a continuation-in-part of Ser. No. 781,865, Dec. 6, 1968, abandoned, which is a continuation-in-part of Ser. No. 714,943, March 21, 1968, abandoned.

[52] U.S. Cl. .................................................351/161
[51] Int. Cl. .............................................G02c 7/04
[58] Field of Search..............................351/160, 161

[56] References Cited

UNITED STATES PATENTS

| | | | |
|---|---|---|---|
| 3,037,425 | 6/1962 | De Carle | 351/161 |
| 3,270,099 | 8/1966 | Camp | 351/161 |
| 3,472,581 | 10/1969 | Bronstein | 351/161 |

OTHER PUBLICATIONS

Williamson–Woble, Article in Transactions of the Ophth. Soc. of the United Kingdom, Vol. 76, 1956, pgs. 633–647 cited.

De Carle Articles I Contacto, Vol. 3 Jan. 1959, pgs. 5,6, 8 and 9 cited.

De Carle Articles II Contacto, Vol. 4, June 1960, pgs. 185–188, 190–193 cited.

Bailey, Article in Optical Journal & Review Dec. 15, 1959, pgs. 44–45, 48 and 50

Precision–Cosmet Digest, Vol. 2, No. 8, March 1962 pgs. 1–6 cited

Grosvenor, Contact Lens Theory & Practice Textbook, 1963 pgs. 288–295 cited

Mandell, Article in Optometric Weekly June 1, 1967 pgs. 19–21 cited copy in 351/161

Bier, Article in Am. J. of Optometry & Archives Nov. 1967, pgs. 687–710

Bronstein, Article in Optometric Weekly, June 20, 1968, pgs. 45–48 cited

*Primary Examiner*—David H. Rubin
*Attorney*—Shoemaker & Mattare

[57] ABSTRACT

A bifocal corneal contact lens and method of making same wherein a carrying lens or lens body has a corrective optical prescription for viewing distant objects and has a near viewing portion or bifocal segment fused in an indentation of one surface thereof, said near viewing portion having a corrective optical prescription for viewing near objects, the lens body having a predetermined power to correct for distant vision and the segment having a power equal to the exact refractive add of the eye to correct for near vision and having a size in relation to the size of the pupil of the eye so that the optimum focal points of the lens body and segment are spaced apart a distance less than the radius of the eye and actually overlap and blend together to give a clear and continuous image when the gaze is shifted between near and distant objects without any optical jump or fuzziness of vision occurring.

4 Claims, 15 Drawing Figures

INVENTOR
CLAUD A. KENDALL

BY Shoemaker and Mattare

ATTORNEYS 3,726,587

INVENTOR
CLAUD A. KENDALL

BY Shoemaker and Mattare
ATTORNEYS

PATENTED APR 10 1973

INVENTOR
CLAUD A. KENDALL

BY Shoemaker and Mattare
ATTORNEYS

BIFOCAL CORNEAL CONTACT LENS AND METHOD OF MAKING SAME

This application is a continuation-in-part of application Ser. No. 844,801, filed July 25, 1969 now abandoned, which is a continuation-in-part of application Ser. No. 781,865, filed Dec. 6, 1968, now abandoned, which is a continuation of application Ser. No. 714,943, filed Mar. 21, 1968, and now abandoned.

BACKGROUND OF THE INVENTION

This invention relates to a multifocal length lens and particularly to a bifocal corneal contact lens which does not produce optical jump or fuzziness of vision as the patient shifts his gaze from near to far objects and vice versa and which has a much thinner and lighter construction than prior art bifocal contact lenses.

Bifocal corneal contact lenses are relatively new, having been in use since only about 1957, and have met with only limited success due to he problems inherent in their construction.

Bifocal contact lenses are designed primarily to correct the effective focal lengths of the eye so that images will be focused on the retina rather than the it or in front of it as in the case of persons suffering from hyperopia or myopia or the like. Also, such lenses have utility in those persons suffering from presbyopia or those persons who due to some disease or injury of the eye desire a cosmetic effect.

Such prior art lenses place the portion of the lens for viewing distant objects in the central portion of the lens and use the peripheral area of the lens for viewing near objects. This procedure or method is generally employed due to the difficulty in maintaining the lens oriented properly with respect to the eye, and with the near viewing segment located peripherally the patient can glance downwardly and be able to look through the near segment for viewing near objects regardless of the rotational position of the lens on the eye. Many prior art lenses attempt to overcome this problem by locating the near segment in the lower edge of the lens and either truncating the lens or providing it with prism ballast or both to maintain the lens oriented relative to the eye. All of these methods, however, produce other problems of a serious nature which are an incident of the particular construction used.

For example, when the far segment is located centrally of the lens, the lens must be made very thick in order to permit the proper curvature of the peripheral near viewing portion for producing the desired plus power of the lens. In other words, the steep curvature necessary to produce a high plus power is placed in the large diameter near viewing portion resulting in a correspondingly thicker lens. Also, with the far segment located in the center, the patient has to maintain his head erect and glance downwardly with his eyes in order to see near objects through the peripheral near portion, thus requiring a conscious effort on the part of the patient each time he shifts his gaze from a far to near object and vice versa. When a lens having a centrally located far segment is used under conditions of dim lighting, such as at night, the pupil dilates thus bringing into play more of the peripheral near portion resulting in reduced visual acuity for viewing distant objects and when the patient looks down at a book, for example, the pupil constricts resulting in reduced visual acuity for viewing near objects.

In lenses which have the near viewing segment located at the lower edge of the lens, truncation of the lens or prism ballast, or both, must be employed to maintain the lens properly oriented relative to the eye. In either case, the lenses thus produced are very thick and heavy.

In lenses embodying either the centered far segment or off-center far segment with prism ballast, the resulting thick lens is undesirable from the standpoint of discomfort to the user of such lens and, more importantly, with respect to metabolism of the eye. When a thick lens is used, undesirable pressures are created on the eye as the eyelid moves over the lens, the temperature of the eye increases beyond normal limits due to the heat insulating qualities of the lens, and the normal flow of tears or lacrimal fluid is interrupted. All of these characteristics can produce serious disorders in the eye.

Even apart from the harmful physiological effects thus produced, such lenses do not provide good vision. For example, when the distance viewing segment is located in the center of the lens, rays passing through the central part of the lens are focused remote from the lens and rays passing through the peripheral part of the lens are focused near the lens. This action produces a pronounced spherical aberration with consequent fuzziness in the field of vision. This condition is worsened by the use of greater add in the peripheral near viewing portion required because of the central location of the distance viewing segment. Also, as the patient shifts his gaze from near to far objects and vice versa a pronounced jump or shift in the field of vision occurs, attended by blurring or fuzziness in the field of vision.

Attempts have been made in the prior art to locate the near viewing portion or bifocal segment of the lens in the central part of the lens. Applicant does not known of any prior art bifocal contact lens which has the near viewing portion or bifocal segment centered in the lens and which is successfully fitted to a patient. The lack of success of such lenses in the prior art is due to the fact that in accordance with the knowledge and teachings followed in the prior art in making and fitting such lenses, the focal lengths of the carrying lens and the bifocal segment are made significantly different, with the carrying lens and bifocal segment actually constructed and functioning as two completely separate and independent optical systems. Moreover, the depth of focus of the bifocal segment is relatively small and as the near point focal power of the lens is increased by giving the segment more add to correct for near vision, the depth of focus is made even smaller and the focal points of the bifocal segment and carrying lens are even further separated.

The prior art teaches that the power of the bifocal segment must be increased by giving it sufficient add to compensate for the tear layer of the eye. For example, if a patient is farsighted and an add of +1.00 is required to correct for distance vision, the carrying lens is given an add of +1.00. Then the amount of add required to correct for near vision is determined and let it be assumed that an add of +2.00 is indicated. The prior art teaches that the bifocal segment be given an add equal to this amount plus an add of +1.00 to +1.50 to correct for the tear layer, or in other words, a total add of +3.00 to +3.50. If the larger figure is assumed as the amount of add given the segment, the lens has a total power of +4.50, which results in an extremely large separation of the near and far focal points of the lens with the result that totally unsatisfactory vision occurs with the lens. This is because of the fact that as the gaze or image is shifted between near and far objects, there is a large area where rays are not focused. In fact, the rays are adequately focused only at the near and far focal points, and at the intermediate area between these focal points the rays are not focused, with the result that the lens does not give satisfactory intermediate vision. Accordingly, a person wearing a lens constructed in accordance with the teachings of the prior art would have adequate near and distance vision but would have almost no intermediate vision and would experience considerable fuzziness of vision and optical jump when he shifts his gaze between near and far objects.

Thus, as can be seen, although previous attempts at making bifocal contact lenses have met with some success and in some cases have produced amazing results in persons who were nearly blind, they are far from being satisfactory and produce many serious problems as a consequence of which many people cannot or will not wear them.

The present invention solves all of these problems inherent in prior art bifocal contact lenses by providing a corneal bifocal contact lens which, by locating the bifocal segment in the center area of the lens and making the diameter of such segment smaller than the near point pupil size, and by closely relating the powers of the carrying lens and bifocal segment, enables the user of the lens to shift his gaze from near to far objects and vice versa without experiencing any optical jump or fuzziness in his field of vision and without requiring any conscious effort on his part to maintain his head or eyes oriented in any particular fashion.

It is important in the present invention that the relationship of the powers of the bifocal segment or near viewing portion and the carrying lens or distance viewing portion with respect to each other and to the eye and the relationship of the size of the bifocal segment to the near point pupil size of the eye, wherein the bifocal segment and carrying lens have a common principal optical axis with each other and with the eye, is such that the optimum theoretical focal points of each portion are spaced very close together and actually blend, thus resulting in a continuous range from the near limit to the far limit through which rays entering the eye are focused and resulting in a clear and continuous image throughout the range when the gaze is shifted between near and distant objects and giving enhanced visual acuity for viewing distant objects as well as enhanced visual acuity for viewing near objects.

More particularly, in applicant's lens the bifocal segment is given an add equal to the exact refractive add of the eye required to correct for near vision and no compensation is made for the tear layer. Further, the bifocal segment is given a diameter within the range of 0.10 to 0.30 mm less than the near point pupil size of the eye under an active state of near accommodation. This arrangement spaces the focal points of the near and distance viewing portions of the lens very close together and the near focal point has a substantially increased depth of focus due to the size of the bifocal segment in relation to the pupil size. The lens actually focuses the rays in two areas and the collection or bundle of rays thus focused define a spherical conoid, with the far limit of the near focal point overlapping the near limit of the distance focal point to create a continuous focusing or collection of rays over a single, composite focal area. Accordingly, a clear and continuous image results with good vision in the intermediate area between the near and distance focal points, where the image is actually most clearly focused, since as the patient shifts his gaze from a close object to a distant object and vice versa, the actual focus shifts back and forth through the collection of rays or spherical conoid formed by the two focal areas blending together. Under some conditions, a slight blurring of the image might occur at the circle of least confusion, but due to the small size of the circle of least confusion resulting from the close spacing of the near and distant focal points, this blurring of the image is not observed by the patient and, in effect, continuous vision or focus from far objects to near objects, and vice versa, is given. The central rays of the near and distance focal points are common with one another and the rays of the near focal point thus reinforce the focus of the image at the distance focal point, and vice versa, to aid in giving a smooth transition of the image as the focus of the entire system shifts back and forth between the near and distance focal points.

The imaging properties of the present bifocal lens are thus completely different from any prior art bifocal lens. In accordance with the present invention, a spherical system is used and the rays are focused at a point. Actually, the true condition presented is that of two different focuses on the same common principal optical axis creating two different depths of focus, each blending with the other and forming a spherical conoid. This is in contradistinction to prior art lenses which embody a sphero-cylindrical system to focus rays on a line, the rays from a distant object focusing on a line disposed at 180° relative to the line on which the rays are focused from a near object, to result in an aberration known as Sturm's s conoid, and the circle of least confusion between the two focal points is relatively large. With the present lens system and the point focuses of two different but cooperating depths of focus, a spherical conoid results, with a relatively small crises or circle of least confusion.

The bifocal segment size is very important in giving a clear and continuous image with reference to the present lens system in that the bifocal segment is sized to act as a pinhole aperture to give greater depth of focus at the near focal point. The size varies from patient to patient, of course, but the relationship of the size of the segment to the near point pupil size is critical to keep the effectiveness of the system constant. That the bifocal segment acts as a pinhole aperture is clear when the action of the lens is considered. When viewing near objects, the focusing action of the eye in conjunction with the focusing action of the lens causes rays passing through the bifocal segment from a near object to be focused on the retina and hence seen, and rays which pass through the carrying lens or distant viewing portion are not focused on the retina and hence are not seen. In effect, the carrying lens or distant viewing portion occludes or blocks rays when a near object is being viewed, with the result that if the distance of the object from the optical axis is small as compared with its distance from the lens, and if the size of the lens is also small, all light reaching the lens from the object will be in the paraxial region and a pinhole effect will be achieved, with a very great depth of focus.

Additionally, the lens of the present invention is significantly thinner than prior art lenses and as a result does not create undesirable pressures or temperatures on the eye nor in any other way interfere unreasonably with the normal metabolism of the eye. The lens of the present invention is thus suitable for use on patients requiring bifocal type lenses who heretofore could not or would not use bifocal contact lenses. Moreover, the lens may be fitted according to the method used in fitting a single vision lens, it being necessary only to position the near viewing segment according to the requirements of the person being fitted.

OBJECTS OF THE INVENTION

It is an object of this invention to provide a bifocal corneal contact lens which produces a close spacing between the near and distance focal points, with the bundle or collection of rays at the focal points overlapping and defining a spherical conoid and which also produces a pinhole effect thus giving a sharp image throughout the focal range of the lens without causing optical jump or fuzziness of the image.

Another object of this invention is to provide a bifocal corneal contact lens which is significantly thinner than prior art bifocal contact lenses and thus does not unreasonably interfere with normal metabolism of the eye.

Another object of this invention is to provide a bifocal corneal contact lens which has generally the same dimensions as a single vision lens.

A still further object of the invention is to provide a bifocal contact lens that is not critical to changes in position of the lens on the surface of the eye.

Yet another object of the invention is to produce a lens structure that appears to the eye as a single lens at all times.

These and other objects of the invention will become apparent after a study of the following detailed description and of the drawings appended hereto, in which like reference numerals refer to like parts throughout the several views.

DETAILED DESCRIPTION OF THE INVENTION

Figure 1:
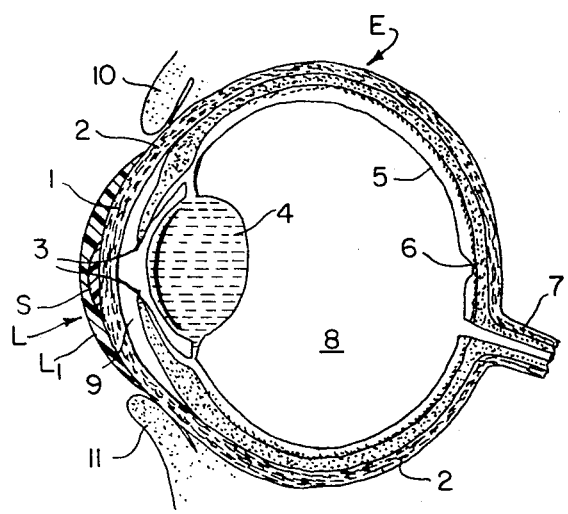
FIG. 1 is a diagrammatic cross-sectional view of the human eye showing a bifocal corneal contact lens in position.

In FIG. 1 a human eye E is shown having a cornea 1 and a sclera 2 joined by the limbus or limbal area within which a corneal contact lens is normally fitted. Behind the cornea 1 is the iris or pupil 3, opening onto the lens 4 which focuses images onto the retina 5, within which is located the central vision area or fovea centralis 6 and from which extends the optic nerve 7. Located within the eye behind the lens 4 is a vitreous humor 8, and between cornea 1 and lens 4 is an aqueous humour 9. Disposed to cover the cornea, are upper and lower lids 10 and 11. Overlying the cornea 1 and extending to the limbal area is a lens 1 comprising a peripheral portion or carrying lens body $L_1$ for viewing distant objects and a centrally located near viewing portion or bifocal segment S for viewing near objects.

Figure 2:
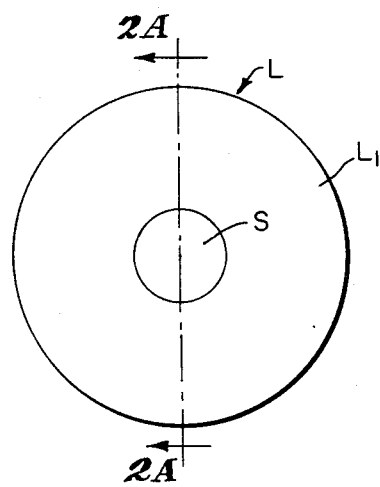
FIG. 2 is a vertical plan view of a bifocal corneal contact lens according to the present invention.
Figures 2A, 2B:
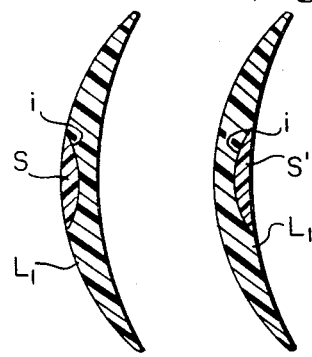
FIG. 2A is a vertical sectional view of the lens shown in FIG. 2, taken along line 2A—2A.
FIG. 2B is a view similar to FIG. 2A but showing the segment on the posterior side of the lens.

In FIGS. 2 and 2A, a bifocal corneal contact lens L having a near viewing portion or bifocal segment S fused into the anterior surface of lens body or carrying lens $L_1$ is shown and in FIG. 2B, a lens L having a near viewing segment S' fused into the posterior surface of lens body $L_1$ is shown. In these lenses, the overall outer dimension of the lens is chosen substantially as for a single vision lens, the curvature of the segment S being the same in each case as that of the surface of the lens in which the segment is fused to provide a smooth, continuous anterior or posterior curvature. The interface curvature $i$ between the segment S and the lens body $L_t$, taken with the refractive indices of the materials used, is determinative of the power of the lens L. The size of the bifocal segment S in each case is within the range of 0.10 to 0.30 millimeters less than the near point pupil size under an active state of near accommodation and accordingly produces a pinhole effect, since when a near object is being viewed, rays passing through the peripheral part of carrying lens $L_1$ are not focused on the retina and hence are not seen or are, in effect, occluded. By acting in the nature of a pinhole aperture, the depth of focus of the bifocal segment S is greatly increased.

Figure 3:
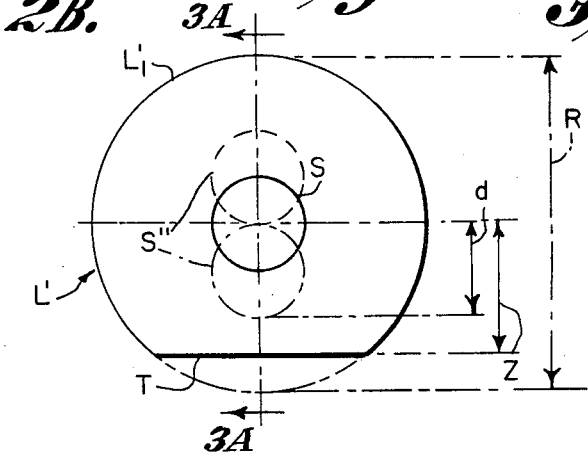
FIG. 3 is a vertical plan view of a modification of the lens shown in FIG. 2 and wherein the lens is truncated and provided with prism ballast.
Figure 3A:
FIG. 3A is a vertical cross-sectional view of the lens of FIG. 3, taken along line 3A—3A.

FIGS. 3 and 3A illustrate an embodiment of the invention wherein the lens body L' is truncated at T and provided with prism ballast to maintain the lens properly oriented relative to the eye. In this lens, the near viewing portion or bifocal segment S may be located centrally or offset above or below the geometric center of the lens as shown in dotted line at S''. Due to the additional thickness and weight of a truncated lens having prism ballast, this lens is used only when necessary to correct for astigmatism.

Figure 4:
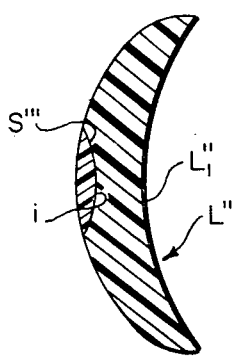
FIG. 4 is a vertical cross-sectional view of a conventional bifocal contact lens illustrating the difference in degree of curvature of the anterior curve and consequent increased thickness when the distance viewing portion of the lens is located centrally.

In FIG. 4 a conventional bifocal contact lens L'' is shown for purposes of comparison. As can be seen, the lens body L'' has a much steeper anterior curve and is accordingly much thicker than the lens L or L' of the present invention. The steeper curvature on the lens L'' is necessary in order to achieve the proper plus power for the near viewing peripheral portion, and as can be seen, the interface $i$ between the distance viewing segment S''' and near viewing lens body L'' is much flatter than in the lens of the present invention. Of course, the distance viewing segment S''' could be placed in the posterior surface of lens body L'', rather than the anterior surface as shown, but the thickness of the lens would not be reduced by doing so. Thus, as can be seen, the lens L or L' of the present invention can be made much thinner simply by placing the near viewing segment S in the center of the lens body $L_1$ or $L_1'$, which is used for viewing distant objects. This is due to the fact that the diameter of the segment is much smaller than the diameter of the lens body $L_1$ or $L_1'$, and accordingly, for a comparable curve and corresponding power of the lens, the overall thickness of the lens can be kept to a minimum necessary only to accommodate the segment S and prevent unreasonable weakness of the lens body. Accordingly, instead of having a relatively thick lens with a segment S''' fused into one surface thereof in what amounts to a very shallow indentation, a relatively thin lens L or L' can be realized having a segment S for viewing near objects fused into one surface thereof; the thickness of the lens being determined solely by the amount of curvature required in lens body $L_1$ or $L_1'$ to correct for viewing distant objects and for accommodating the relatively small segment S for viewing near objects.

Figure 5:
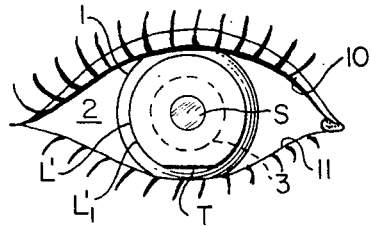
FIG. 5 is a diagrammatic plan view of a truncated lens according to the present invention to correct for astigmatism in place of a human eye gazing straight ahead.
Figure 5A:
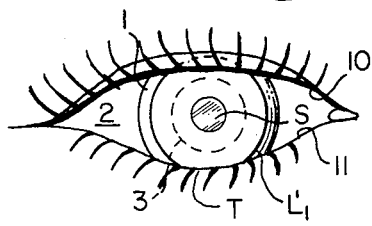
FIG. 5A is a view similar to FIG. 5 showing the lens as it is positioned on the eye when gazing downwardly at near objects.

In FIGS. 5 and 5A, a bifocal corneal contact lens L' is shown in position on cornea 1 with the near viewing segment S disposed substantially in the center of, and being smaller in diameter than, pupil 3. The relative sizes of the segment S and pupil 3 are shown diagrammatically, the segment having a size 0.10 to 0.30 millimeters less than the near point pupil size as aforedescribed to produce an aperture or pinhole effect and the resultant increased depth of focus.

In FIG. 5 the eye is shown gazing straight ahead with truncated edge T of lens L' spaced slightly above lower lid 11 of the eye. In this view, segment S is invisible to the eye due to the small size of the segment relative to the pupil and the focusing action of lens 4, which brings into play more of the peripheral distant viewing portion L', thus enhancing visual acuity for viewing distant objects. In FIG. 5A, the eye is gazing downwardly with truncated edge T of lens L' engaging lower lid 11 to position the lens; and segment S, due to its small size is still positioned substantially centrally of pupil 3. In this position, the peripheral portion L' is invisible to the eye and near viewing segment S comes into play due to the focusing action of lens 4, thus enhancing visual acuity for viewing near objects. When the gaze is shifted from viewing far objects to viewing near objects and vice versa there is a gradual transition from one to the other without any optical jump or fuzziness occurring in the field of vision. This is due in part to the occlusion of rays by the peripheral portion of the lens and the resultant pinhole effect achieved by the small diameter segment S, which produces a very long depth of focus, and in conjunction with the relatively long spherical conoid produced by the close spacing and overlapping of the focal points of the segment S and lens body L', provides a range throughout which the rays are sharply focused. This can be best explained by looking at FIGS. 6 through 11.

Figure 6:
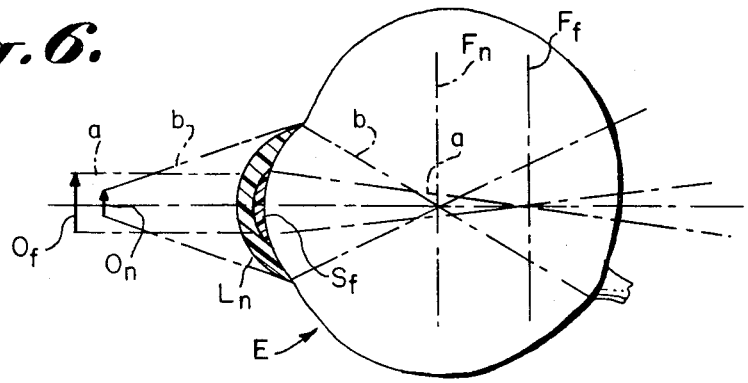
FIG. 6 is a diagrammatic vertical cross-sectional view of a human eye with a conventional bifocal contact lens having the distance viewing segment located in the center of the lens and showing the spherical aberration which results.

In FIG. 6 a conventional bifocal corneal contact lens is shown having the segment $S_f$ for viewing distant objects located in the center of the lens $L_n$ for viewing near objects. In this type of lens the rays $b$ from near object $O_n$ are focused at a point $F_n$ near the lens by the peripheral portion of the lens while the rays $a$ from a distant object $O_f$ are focused remote from the lens at a point $F_f$ by the central portion $S_f$ of the lens. Rays focused in this manner create a spherical aberration resulting in fuzziness in the field of vision. An astigmatic Sturm's Conoid, for example, results when the rays from a near and a distant object, respectively, are focused along a pair of spaced perpendicular lines, the rays twisting through 180° from one line to the other. In this circumstance, the rays are never actually focused at a point and clear vision cannot be achieved. Moreover, when the segment $S_f$ for viewing distant objects is located in the center of the lens, more add is required to achieve the proper corrective optical prescription and the spherical aberration is increased or worsened creating an even fuzzier image.

Figure 7:
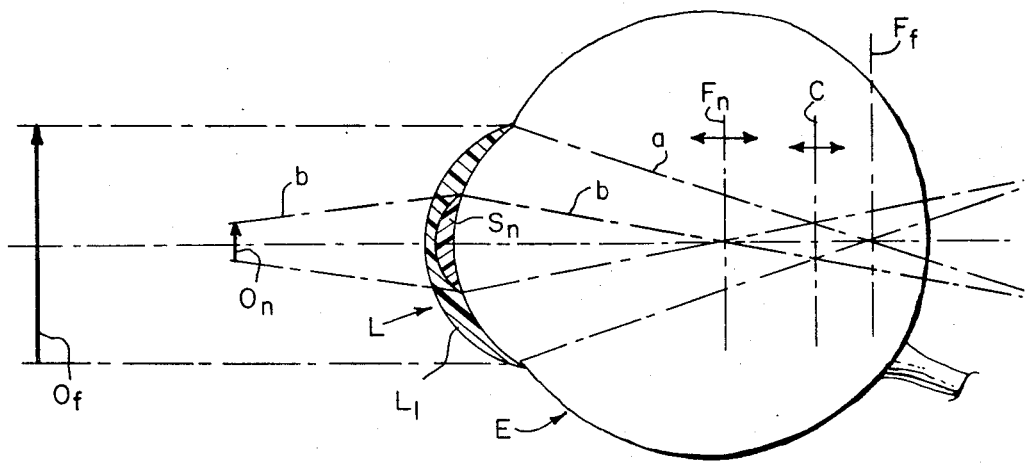
FIG. 7 is a view similar to FIG. 6 but showing a bifocal contact lens according to the present invention on the eye and the resultant spherical conoid.

In FIG. 7, on the other hand, a bifocal corneal contact lens L according to the present invention is shown having a segment $S_n$ for viewing near objects $O_n$ located in the center of the lens body $L_1$. In this lens, rays $a$ from distant objects $O_f$ are focused remote from the lens at a point $F_f$ by the peripheral portion of the lens $L_1$ and rays $b$ from a near object $O_n$ are focused by segment $S_n$ at a point $F_n$ close to the point $F_f$, the rays $a$ and $b$ from the far and near objects thus blending together to produce a spherical conoid, as opposed to an astigmatic Sturm's Conoid wherein the rays twist to focus along two spaced perpendicular lines. The near limit of the spherical conoid is defined by $F_n$ and the far limit is defined by $F_f$. Intermediate points $F_n$ and $F_f$ is the circle of least confusion C at which point there is a blending of the $F_n$ and $F_f$ rays but where the image is focused least sharply. The blending of rays gives a clear image of an object placed somewhere between $O_f$ and $O_n$, however, since the close spacing of points $F_n$ and $F_f$ makes the circle of least confusion relatively small. As explained previously, a Sturm's Conoid is considered a form of spherical aberration and produces fuzziness in the field of vision. However, as can be seen, the spherical conoid produced by the lens of the present invention is exactly opposite the spherical aberration shown in FIG. 6 in the sense that the central rays $b$ are focused at a near point $F_n$ and the peripheral rays $a$ are focused at a far point $F_f$, whereas in a spherical aberration, the central rays $a$ are focused at a near point $F_n$. Thus, in a spherical aberration the blending or fusion of rays $a$ and $b$ never occurs. Moreover, because the near viewing segment $S_n$ is located in the center of the lens body $L_1$, the amount of add required for lens $L_1$ and the segment $S_n$ is more closely related. For example, a +1.0 add may be required for lens $L_1$ to correct for distance vision and a +2.0 add required for segment $S_n$ to correct for near vision, the amount of add given segment $S_n$ to correct for near vision being the exact amount of refractive add indicated as required by the eye. This close relationship between the add given each portion of the lens L reduces the distance between the points $F_n$ and $F_f$ until the rays focused at the focal points actually blend together, thus decreasing the diameter of the circle of least confusion and in general creating a sharper image throughout the range of the spherical conoid thus defined. Also, the pinhole effect and long depth of focus achieved by the small diameter segment $S_n$ is on the near focal side where it is needed, as the position of objectives affects the focus more in this location than they would if the rays were focused distantly. As the gaze is shifted from a near object to a far object and vice versa, the focused image thus shifts or changes gradually and smoothly between the near point $F_n$ and the far point $F_f$ without any optical jump or undue fuzziness occurring. The same principle applies whether the lens is truncated as shown in FIG. 3 or circular as shown in FIG. 2.

Figure 8:
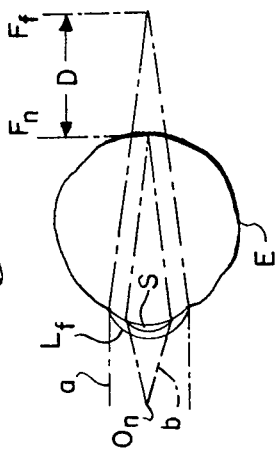
FIG. 8 is a view similar to FIG. 7, showing the large spacing between the focal points of the near and distance viewing portions of a prior art lens having the near viewing portion or bifocal segment in the center of the lens and with the near focal point on the retina and the distance focal point spaced behind the retina and not seen.
Figure 9:
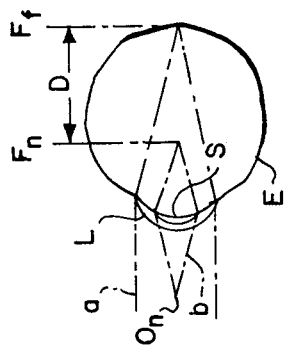
FIG. 9 is similar to FIG. 8, but with the distance focal point on the retina and the near focal point spaced forwardly thereof and not seen.
Figure 10:
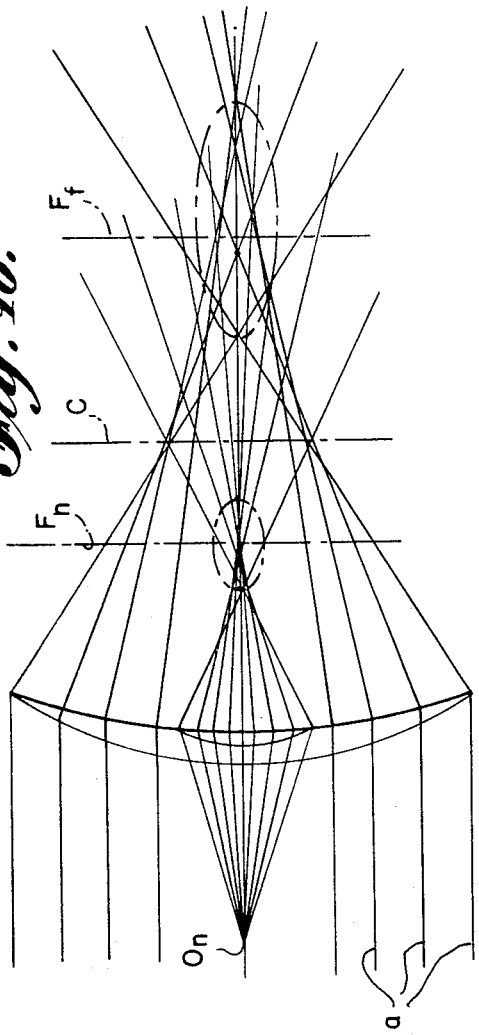
FIG. 10 is a diagrammatic view of the focusing action of the lens shown in FIGS. 8 and 9, showing how the collection or bundles of rays at the near and distance focal points are spaced apart.

FIGS. 8, 9 and 10 depict the focusing action of a one prior art lens, wherein the near viewing portion or bifocal segment S is disposed in the center of the carrying lens $L_f$ for viewing distant objects.

In FIG. 8 this prior art lens is shown in position on an eye E. A near object $O_n$ is being viewed and the rays $b$ from the near object are focused by the segment S on the retina at a near focal point $F_n$. The rays $a$ from a distant object are focused by the carrying lens $L_f$ a distance D behind the retina at a distance focal point $F_f$ and are not seen.

In FIG. 9, a distant object is being viewed and the rays $a$ from the distant object are focused by the carrying lens $L_f$ at a distance focal point $F_f$ on the retina and are seen. The rays $b$ from a near object $O_n$ are focused by the segment S at a near focal point $F_n$ spaced a distance D forwardly of the retina and are not seen.

As can be seen from these two figures, as the gaze is shifted between a near object and a distant object, the two focal points $F_n$ and $F_f$ shift relative to the retina so that one or the other of the focal points is on the retina and the object is seen. There is no focusing of images at the intermediate area between focal points $F_n$ and $F_f$, as in applicant's FIG. 11, and accordingly, there is no intermediate vision with this type lens as is illustrated in FIG. 10.

FIG. 10 is a schematic illustration of the prior art lens $L_f$ showing how the lens and bifocal segment focus rays from distant and near objects, respectively, at two separate and distinct focal areas or arrays 13 and 14. The mid-points of these focal areas or arrays define the near focal point $F_n$ and the distant focal point $F_f$, respectively, and the crisis or circle of least confusion C is positioned between the focal points, closer to the near focal point $F_n$ that the focal point $F_f$, and has a substantial diameter. As the gaze is shifted between near and far objects, the physiological image will be shifted between the focal areas 13 and 14 as depicted in FIGS. 8 and 9. In other words, when a distant object is being viewed, focal area 14 will be in position on the retina; and when a near object is being viewed, focal area 13 will be on the retina. Extremely poor vision will result between these focal areas as the gaze is being shifted from one to the other, with the poorest vision occurring at the circle of least confusion C, see FIG. 10.

Figure 11:
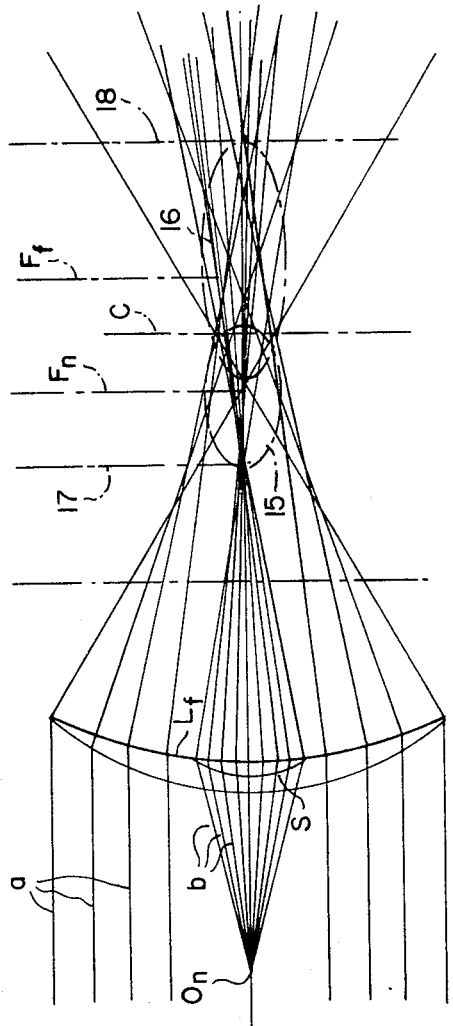
FIG. 11 is a view similar to FIG. 10, but showing a lens according to the invention with the bundles of rays focused by the near and distance viewing portions spaced closely together and overlapping.

Referring now to FIG. 11, the action of the present lens is shown schematically. The lens and bifocal segment S focus rays from a distant object and a near object $O_n$, respectively, over two focal areas or arrays 15 and 16 defining focal points or centers $F_n$ and $F_f$. The two focal areas 15 and 16 overlap at a minor portion of their adjacent ends to define a continuous, composite focal area from the near limit 17 of the focal area 15 to the far limit 18 of the focal area 16 and this overlapping of rays eliminates optical jump and fuzziness of vision and gives good intermediate vision. The size or length of the focal areas 15 and 16, as indicated in phantom lines, represents the depth of focus of each of the lens portions and as can be seen from the figures, focal area 15 has a greater depth of focus than focal area 13. The circle of least confusion C between the focal points $F_n$ and $F_f$ is considerably smaller than the circle of least confusion C in FIG. 10, and accordingly, a much sharper image occurs at the circle of least confusion than in the prior art lens.

Thus, as can be graphically seen in FIGS. 8 through 11, a much sharper image occurs with the present lens throughout the range from the near limit of the near focal point to the far limit of the distant focal point than with the prior art lens.

It has been found in practice that, in general, the diameter of the near segment S has a critical dimension of 2.6 mm in order to render it invisible to the eye and that the overall thickness of the lens L is no more than 0.15 mm on the average. These figures vary from patient to patient, of course, some lenses being as thin as 0.1016 mm but in any respect, the diameter of the near viewing portion or bifocal segment S must bear a relationship to the near point pupil size such that a pinhole effect is achieved. This relationship has been found to result when the bifocal segment size is within the range of 0.10 to 0.30 mm less than the near point pupil size under an active state of near accommodation. This near point pupil size is determined by having the patient look at an object at that patient's reading distance and then immediately measuring the pupil size.

The following chart is given by way of example and is a comparison for some typical prescriptions of the thickness of a central bifocal lens according to the present invention with the thicknesses of a Bicon lens and a Camp fused bifocal lens, respectively.

THICKNESS CHART

| Prescription | Central Bifocal | Bicon | Camp Fused |
|---|---|---|---|
| +2.00 sph. add +2.00 | .2184 | .5791 | ** |
| −2.00 sph. add +2.00 | .1651 | .3454 | ** |
| −7.00 sph. add +2.00 | .1016 | .3454 | ** |
| +2.00 sph. add +2.00 1 ½ΔB. Down −2.00 sph. add +2.00 | ***.3860 | .5791 | .5486 |
| 1 ½ΔB. Down +2.00 + 1.00 × 180 Add | ***.3327 | *.5130 | .4876 |
| +2.00 1 ½ΔB. Down +2.00 +1.00 × 180 Add +2.00 Toric Base C. 44×46 1 ½ΔB. Down | .4064 | *.6299 | .5791 |
| +2.00 +1.00 × 180 Add +2.00 Toric Base C. 44×46 +20.00 catarract lens, | ***.4064 | *.6299 | *.5791 |
| | .2388 | *.4623 | ** |
| add +2.00 | .6045 | *1.2598+ | ** |
| +20.00 catarract lens, add +2.00 Toric Base C. 44×46 | .6045 | *1.2598+ | ** |
| +20.00 catarract lens, add +2.00 Toric Base C. 44×46 1 ½ΔB. Down | ***.7721 | *1.4274 | *1.3054 |

\* if possible
\*\* impossible
\*\*\* not needed

Central Bifocal: 8.0 mm is the average lens diameter used; any size may be used. The exact refractive Add of the eye for near vision is always used.

Bicon: 10.0 mm size recommended; for Bifocal add +1.50 to +2.00 to the Add needed.

Camp Fused at Bottom: 9.5 mm size recommended; for Bifocal add +1.50 to the Add needed.

The contact lens of the present invention may obviously be made from any of the commercially available materials, such as methylmethacrylate, now used for this purpose and may be manufactured in any well known manner. Typical indices of refraction for the lens and for the near viewing segment respectively are 1.49 and 1.57.

With respect to the following specific example, it is to be noted that the total Add for the bifocal contact lens is determined by summing the Add for the lens and the Add for the segment. Thus, if the lens body has a power of +1.50 and the Add of the segment is +1.00, the total near point power is +2.50.

Another aspect of the invention lies in the manner or method of fitting the bifocal corneal contact lens of the present invention, and is given by way of a specific example, and with reference to FIG. 3 as follows:

KENDALL CONTACT LENS SIZE FORMULA

I. Single Vision or Central Bifocal Lens:
1.
  a. $D = 2/3\, C + [1.00 - (ny + X + B)]$
  b. $E = 2/3\, C + [1.50 - (ny + X + B)]$
  c. $A = (D+E)/2$ II. For Prism Ballast Bifocal Lens carry out additional steps as follows:
  d. $R = E + 0.50$
  e. $Z = (r/2) - (t+a)$ The bifocal segment size is found by having the patient look at an object placed at his reading distance, as for example, a 100 watt bright light at a distance of 18 to 20 inches and immediately measuring the pupil, which measurement is taken as the segment size.

The Base Curve is determined by averaging all horizontal curves and averaging all vertical curves, taking the difference of these averages and if the difference is over two units a toric base curve is used; if the difference is not over two units, the average of the horizontal and vertical averages is computed. Once this figure is obtained, reference is made to Chart 1 for the difference needed in the base curve.

CHART I

| Size | Add | Size | Add |
|---|---|---|---|
| 11.6 | −1.00 | 8.8 | +0.75 |
| 11.4 | −0.87 | 8.6 | +0.87 |
| 11.2 | −0.75 | 8.4 | +1.00 |
| 11.0 | −0.62 | 8.2 | +1.12 |
| 10.8 | −0.50 | 8.0 | +1.25 |
| 10.6 | −0.37 | 7.8 | +1.37 |
| 10.4 | −0.25 | 7.6 | +1.50 |
| 10.2 | −0.12 | 7.4 | +1.62 |
| 10.0 | −0.00 | 7.2 | +1.75 |
| 9.8 | +0.25 | 7.0 | +1.87 |
| 9.6 | +0.25 | 6.8 | +2.00 |
| 9.4 | +0.37 | 6.6 | +2.12 |
| 9.2 | +0.50 | 6.4 | +2.25 |
| 9.0 | +0.62 | 6.2 | +2.37 |
| | | 6.0 | +2.50 |

The power of the lens is obtained by subtracting the flattest central curve from the base curve used. This will give a plus or minus power which is added to the spherical equivalent of the refraction. The least plus figure is used. For the bifocal power, use the exact refractive add of the eye for near vision except in cases where the bifocal segment is decentered and the use of prism ballast is required, then take the corrective add as shown in Chart II according to the distance of the top of the segment below the geometrical center of the lens and add it to the exact refractive bifocal add as indicated above.

CHART II

| Distance of top edge of segment below lens geometric center, mm | Corrective Add |
|---|---|
| 0.1 | +0.25 |
| 0.2 | +0.37 |
| 0.3 | +0.50 |
| 0.4 | +0.62 |
| 0.5 | +0.75 |
| 0.6 | +0.87 |
| 0.7 | +1.00 |
| 0.8 | +1.12 |
| 0.9 | +1.25 |
| 1.0 | +1.37 |
| 1.1 | +1.50 |
| 1.2 | +1.62 |
| 1.3 | +1.75 |

EXPLANATION OF TERMS USED $D$ - smallest lens size patient will accept, mm
$E$ - largest lens size patient will accept, mm
$A$ - average of smallest and largest lens sizes patient will accept, mm
$R$ - overall size of prism ballast bifocal lens, mm
$Z$ - distance of top of bifocal segment above bottom edge of truncated lens, mm
$Y$ - overhang of upper lid, mm ($C-F$)
$X$ - lower lid up-ride on limbal area, mm $n$ - corrective factor for variation in size of palpebral fissure:

0.375 for large fissure (11 mm and up)

0.25 for medium fissure (9 mm to 11 mm)

0.125 for small fissure (9 mm and under)

$B$ - 0.3 mm size reduction for stable plastic
1.00 - standard deviation
1.50 - standard deviation
$C$ - corneal height, mm.
$F$ - palpebral fissure, mm.
$t$ - amount of truncation of lens = 05 mm
$a$ - lid position relative to limbal = −0.1 mm/mm above limbal = 0 if on limbal = +0.1 mm/mm if below limbal.

Assume a measurement of the palpebral fissure height $F$, corneal height $C$, and lower lid up-ride $X$ on the limbal gave:

$$F = 7 \text{ mm}$$

$$C = 11 \text{ mm}$$

$$X = 0$$

then $y = C-F = 11-7 = 4$ mm and $n = 0.125$ since the palpebral fissure is small.

Plugging into the formula:
1. for single vision or central bifocal lens:
  a. $D = 2/3\, C + [1.00 − (ny + X+B)] = 2/3\,(11) + [1.00 − (0.125\,(4) + 0 + 0.3)] = 7.332 + [1.00 − 0.8] = 7.532$ mm
  b. $E = 2/3C + [0.150 − (ny + X+B)] = 2/3\,(11) + [1.50 − (0.125\,(4) + 0 + 0.3)] = 7.332 + [1.50 − 0.8] = 8.032$ mm
  c. $A = (D+E)/2 = (7.532 + 8.032)/2 = 7.782$ mm
2. for prism ballast bifocal lens:
  d. $R = A + 0.50 = 7.782 + 0.50 = 8.282$ where $0.50$ = increase in lens size, mm.
  e. $Z = (R/2) − (t+a) = (8.282/2) − (0.5 + 0) = 3.64$ mm The several embodiments described and the specific example given are by way of illustration only and are not intended to be restrictive, other and various modifications as would be apparent to a person having ordinary skill in the art being possible without departing from the spirit of the invention or the scope of the appended claims.

I claim:

1. A bifocal corneal contact lens to be worn on the cornea of a human eye, comprising a thin circular lens body having a near viewing segment fused in the center of one surface thereof and a surrounding distance viewing portion, the near viewing segment and the distance viewing portion having the same principal optical axis, the lens having a thickness within the range of 0.1016 mm to 0.7721 mm, said near viewing segment made of a plastic material having an index of refraction greater than the distance viewing portion and a near focal point spaced rearwardly of the lens, the distance viewing portion having an index of refraction less than the near viewing segment and a distance focal point spaced rearwardly of the near focal point, the near viewing segment having a diameter within the range of 0.1 to 0.3 mm less than the near point pupil size of the eye under an active state of near accommodation and the near viewing segment having a very long depth of focus, said near viewing segment further having a power equal to the exact refractive add of the eye and being uncorrected for the tear layer of the eye on which the lens is to be worn, the focal points of the distance viewing portion of the lens and the near viewing segment being closely adjacent one to the other, the far limit of the near viewing segment spaced farther from the lens than the near limit of the distance viewing portion with the near focal point and the distance focal point overlapping and coacting one with the other, the image rays uninterruptedly focused by the lens throughout the distance from the near limit of the near viewing segment to the far limit of the distance viewing portion, and there being clear uninterrupted vision throughout the entire focal range of the lens.

2. A plastic bifocal corneal contact lens to be worn on the cornea of a human eye, wherein the lens comprises a thin, circular, plastic lens body with a concave posterior surface and a convex anterior surface, a plastic near viewing segment fused in the center of the posterior surface, an annular distance viewing portion surrounding the near viewing segment, the near viewing segment and the distance viewing portion having the same principal optical axis, the thickness of the lens at the center thereof, including the near viewing segment and the adjacent part of the lens is 0.15 mm, the index of refraction of said plastic near viewing segment is greater than the index of refraction of the plastic distance viewing portion and the near viewing segment has a near focal point with a near limit and a far limit and spaced rearwardly of the lens, the distance viewing portion has a distance focal point with a near limit and a far limit and spaced rearwardly of the near focal point, the diameter of the near viewing segment is 2.6 mm and is less than the near point pupil size of the eye under an active state of near accommodation and the near viewing segment has a substantial depth of focus, the power of said near viewing segment is equal to the exact refractive add of the eye for near vision and thus eliminates correcting for the tear layer of the eye on which the lens is to be worn, said lens has a near point power less than three times as great as the distance viewing power, the far limit of the near viewing segment spaced farther from the lens than the near limit of the distance viewing portion, the near focal point and the distance focal point overlapping at a minor portion of adjacent ends thereof and coacting one with the other to define a single, composite focal area including the overlapped part, the image rays uninterruptedly focused by the lens throughout the single, composite focal area from the near limit of the near viewing segment to the far limit of the distance viewing portion.

3. A plastic bifocal corneal contact lens to be worn on the cornea of a human eye, wherein, the lens comprises a thin, circular plastic lens body and a concave posterior surface and a convex anterior surface, a circular plastic near viewing segment fused in the center of the posterior surface, an annular distance viewing portion surrounding the near viewing segment, the near viewing segment and the distance viewing portion having the same principal optical axis, the thickness of the lens at the center thereof at the near viewing segment is 0.15 mm, the index of refraction of said near viewing plastic segment is about 1.57 and the index of refraction of said distance viewing portion is about 1.49, the diameter of said near viewing segment is 2.6 mm and is less than the near point pupil size of the eye under an active state of near accommodation and said near viewing segment has a very long depth of focus, the power of said near viewing segment is equal to the exact refractive add of the eye for near vision and thus eliminates correcting for the tear layer of the eye on which the lens is to be worn, said lens has a near point power which is no more than two and a half times as great as the distance viewing power, said near viewing segment has a near focal point with a near limit and a far limit and spaced rearwardly of the lens, the distance viewing portion has a distance focal point with a near limit and a far limit and spaced rearwardly of the near focal point, the far limit of the near viewing segment spaced farther from the lens than the near limit of the distance viewing portion with the near focal point and the distance focal point overlapping at a minor portion of adjacent ends thereof and coacting one with the other to define a single, composite focal area including the overlapped part, the image rays uninterruptedly focused by the lens throughout the single, composite focal area from the near limit of the near viewing segment to the far limit of the distance viewing portion, and there being clear, uninterrupted vision at both near and distant vision and intermediate vision and throughout the entire focal range of the lens.

4. A plastic bifocal corneal contact lens to be worn on the cornea of a human eye, wherein the lens comprises a thin, circular, plastic lens body with a concave posterior surface and a convex anterior surface, a plastic near viewing segment fused in the center of the posterior surface, an annular distance viewing portion surrounding the near viewing segment, the near viewing segment and the distance viewing portion having the same principal optical axis, the thickness of the lens at the center thereof, including the near viewing segment and the adjacent part of the lens is from 0.1016 mm to 0.7721 mm, the index of refraction of said plastic near viewing segment is greater than the index of refraction of the plastic distance viewing portion and the near viewing segment has a near focal point with a near limit and a far limit and spaced rearwardly of the lens, the distance viewing portion has a distance focal point with a near limit and a far limit and spaced rearwardly of the near focal point, the diameter of the near viewing segment is 0.10 mm to 0.30 mm less than the near point pupil size of the eye under an active state of near accommodation and the near viewing segment has a substantial depth of focus, the power of said near viewing segment is equal to the exact refractive add of the eye for near vision and thus eliminates correcting for the tear layer of the eye on which the lens is to be worn, said lens has a near point power less than three times as great as the distance viewing power, the far limit of the near viewing segment spaced farther from the lens than the near limit of the distance viewing portion, the near focal point and the distance focal point overlapping at a minor portion of adjacent ends thereof and coacting one with the other to define a single, composite focal area including the overlapped part, the image rays uninterruptedly focused by the lens throughout the single, composite focal area from the near limit of the near viewing segment to the far limit of the distance viewing portion.

* * * * *